A. S. KROTZ.
WHEELED IMPLEMENT.
APPLICATION FILED JUNE 6, 1914.
1,215,818.
Patented Feb. 13, 1917.
9 SHEETS—SHEET 4.
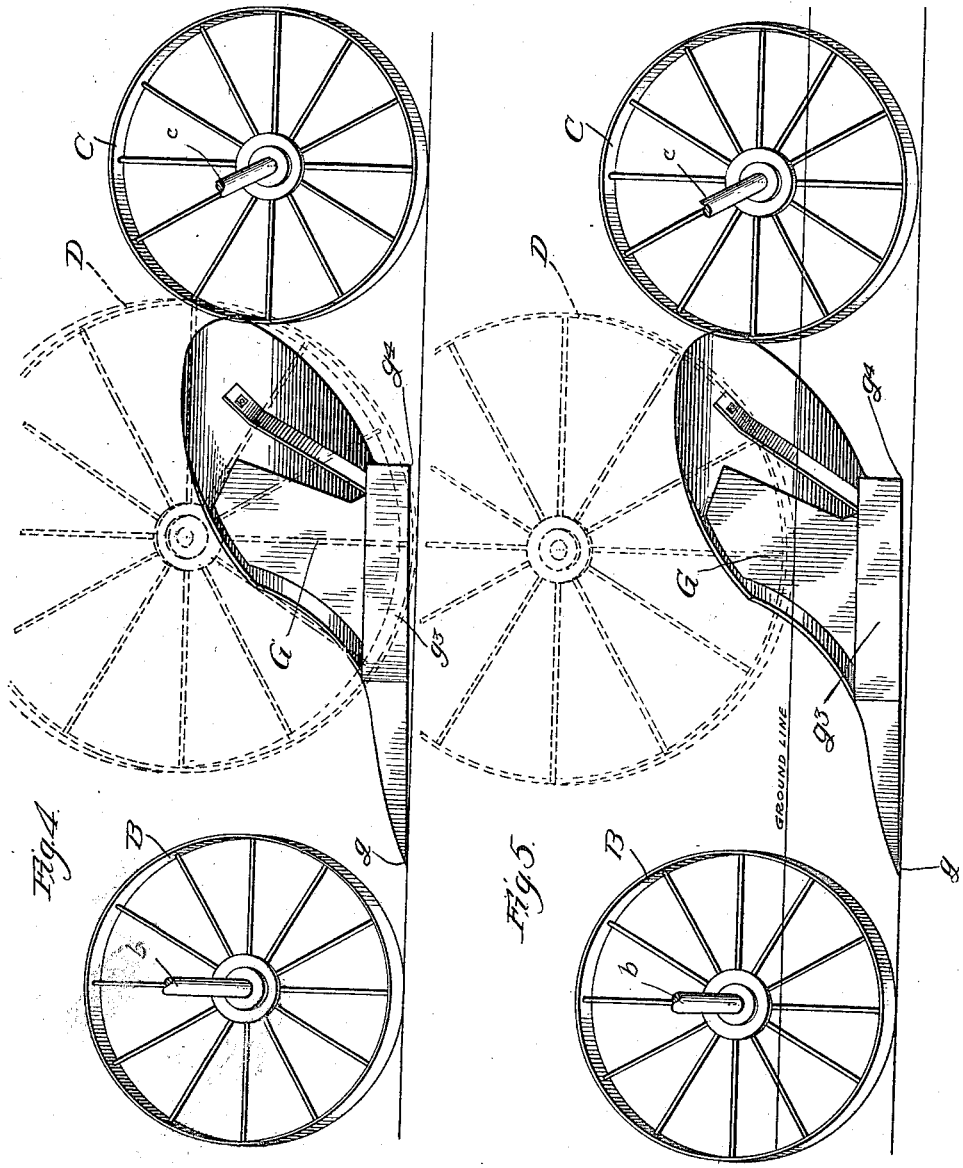

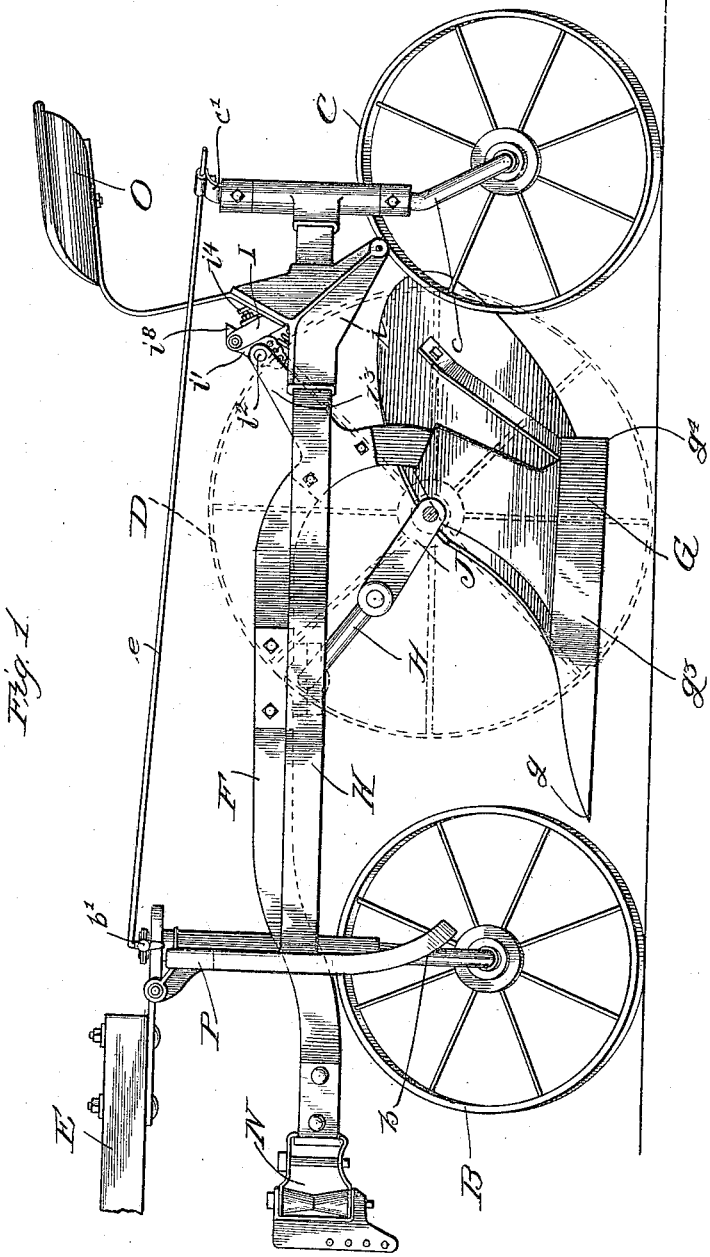

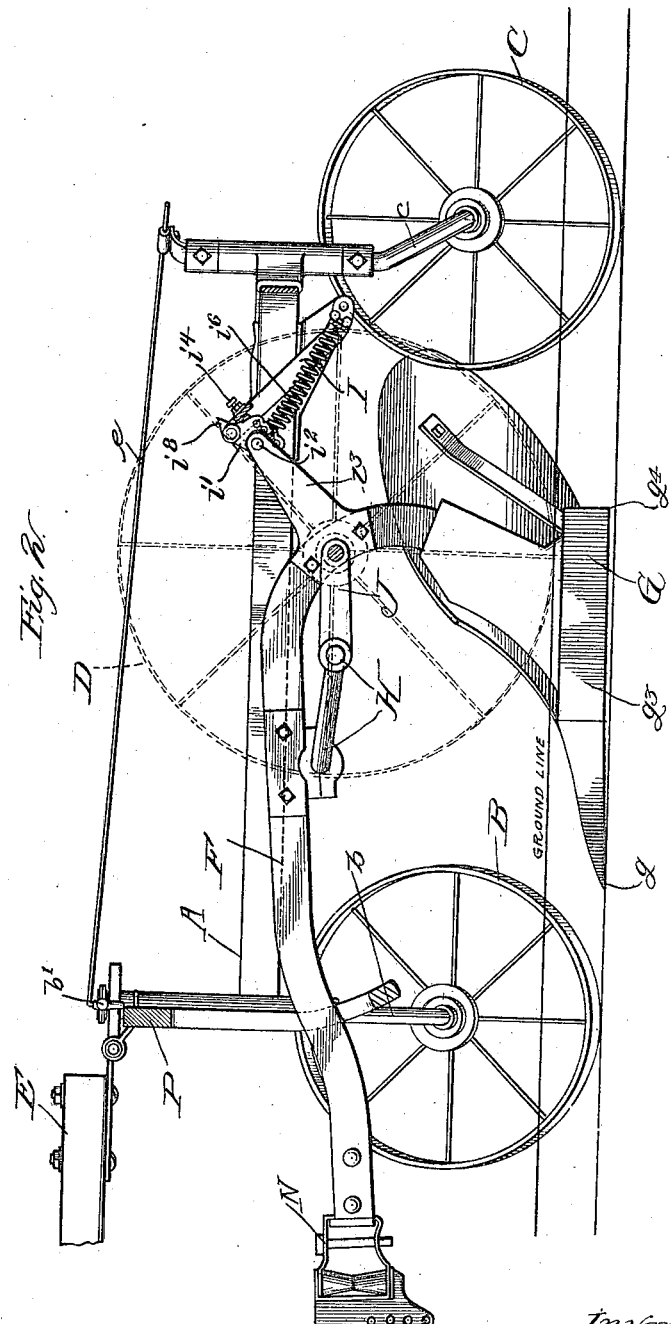

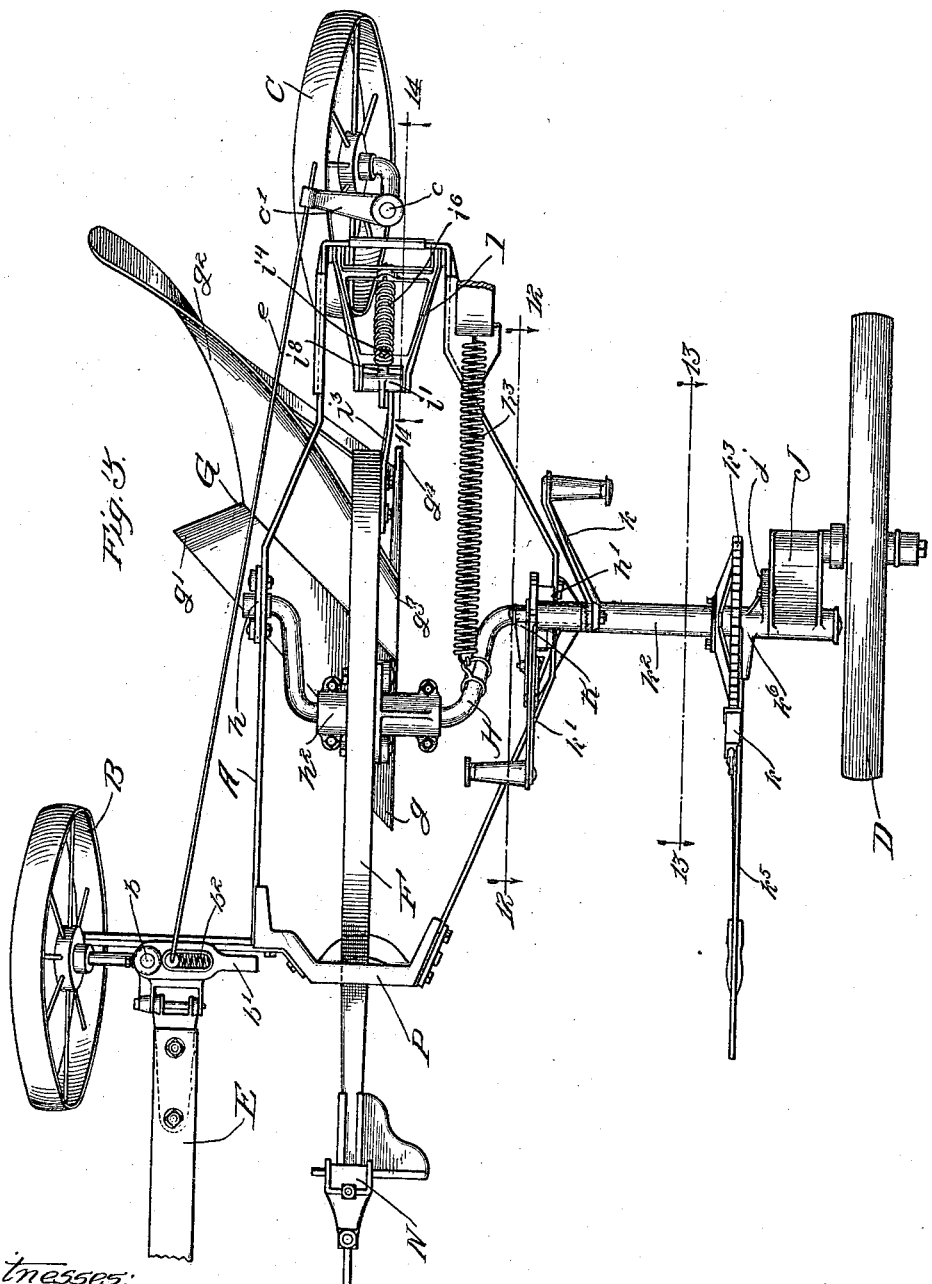

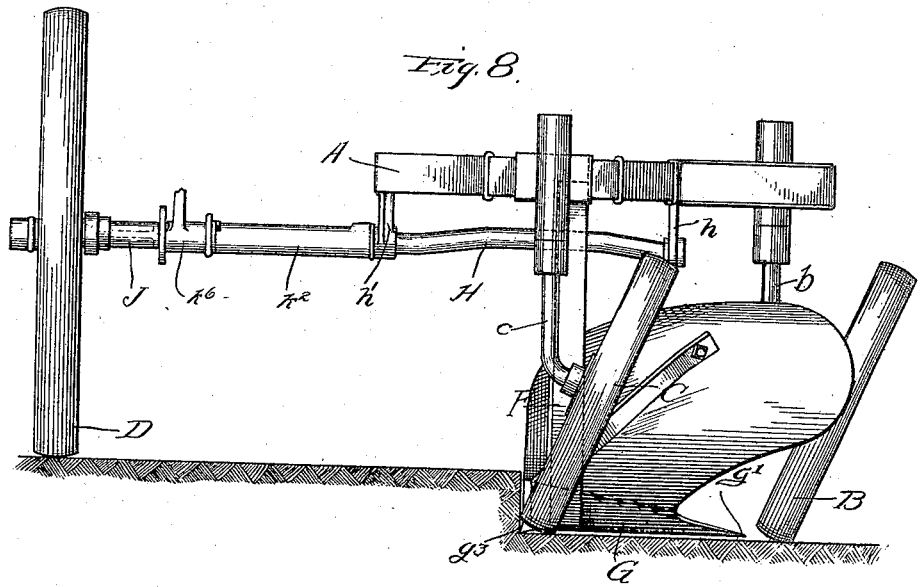
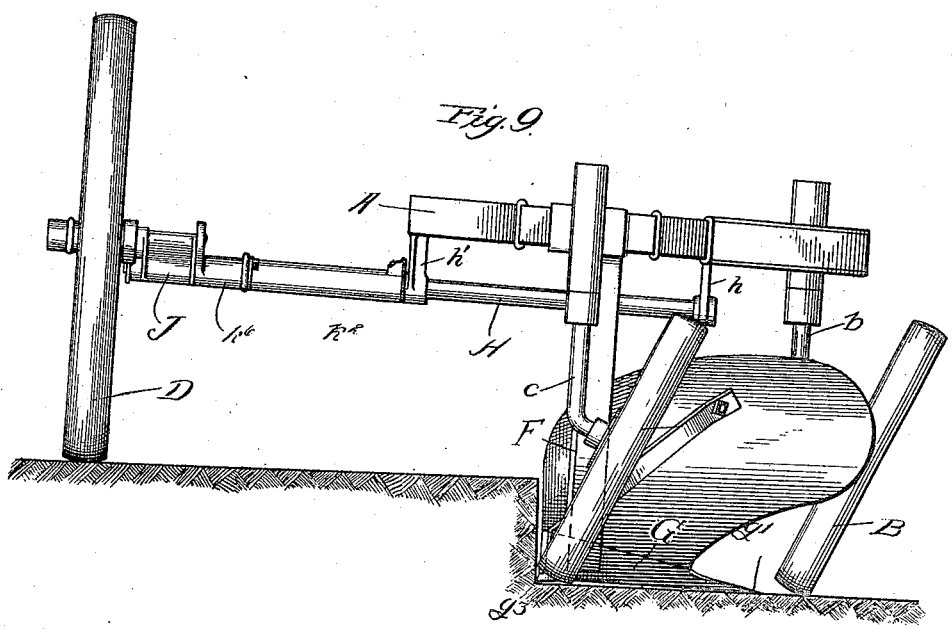

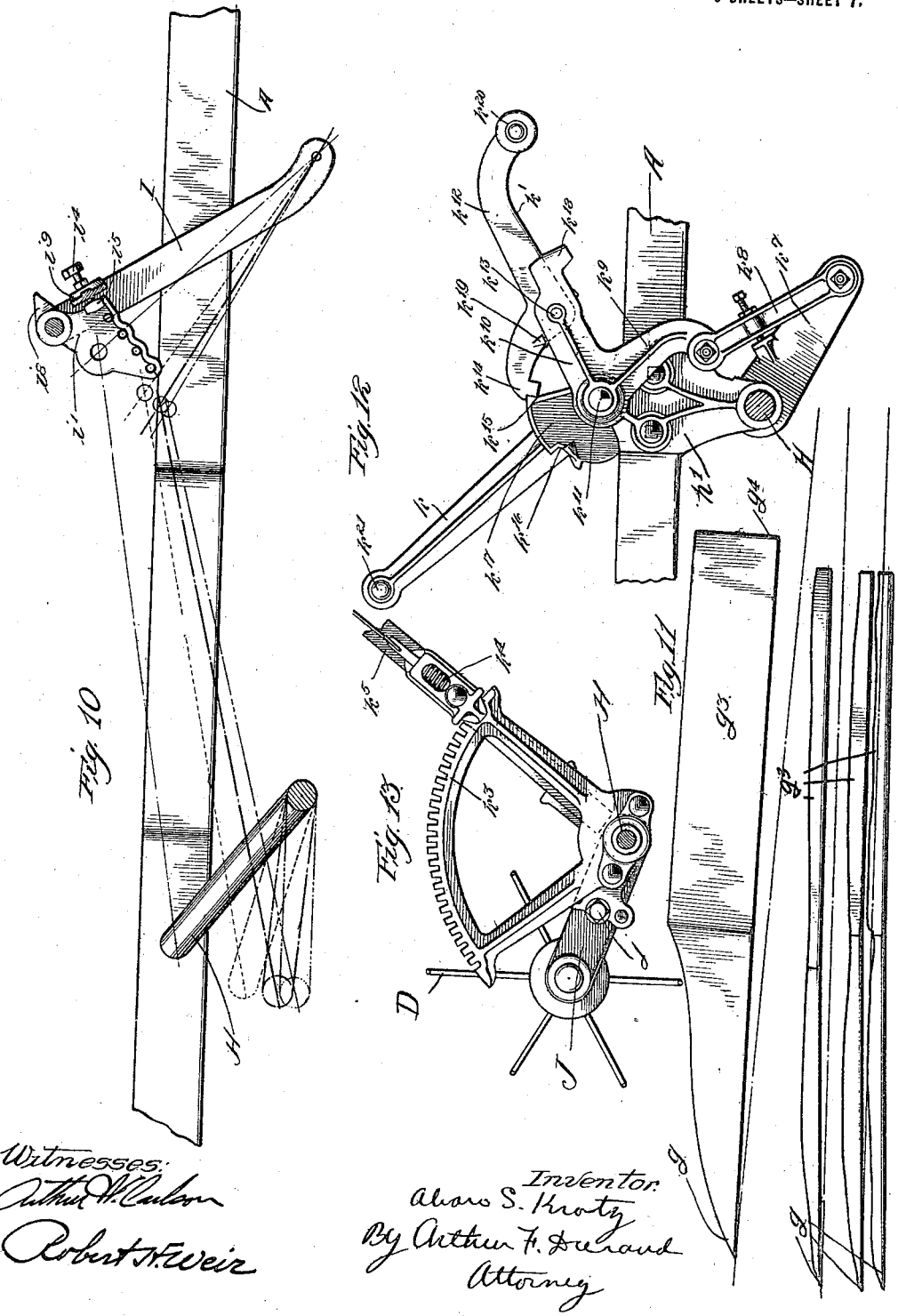

A. S. KROTZ.
WHEELED IMPLEMENT.
APPLICATION FILED JUNE 6, 1914.
1,215,818.
Patented Feb. 13, 1917.
9 SHEETS—SHEET 8.
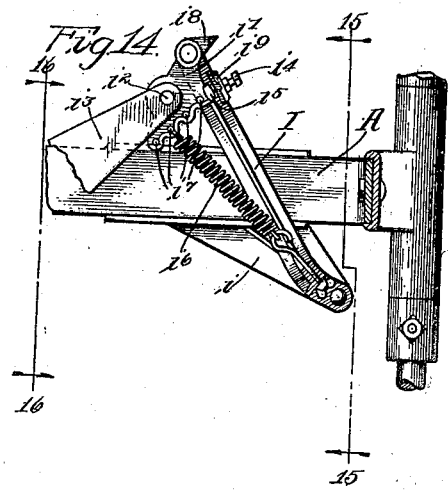
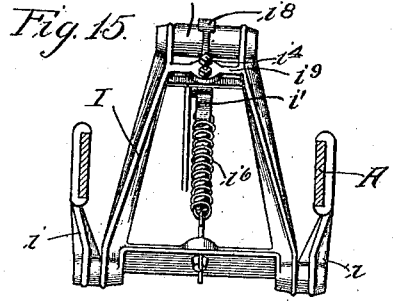
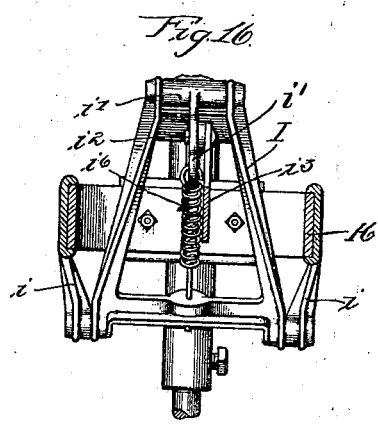
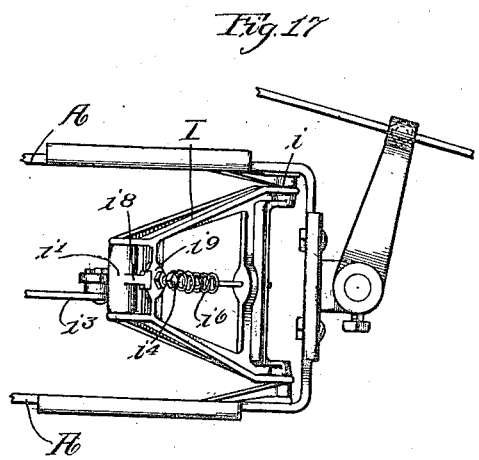
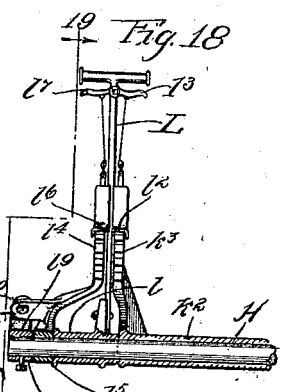
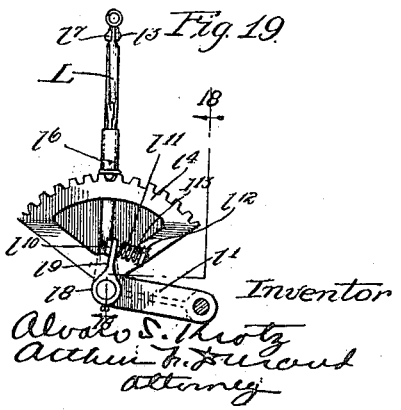

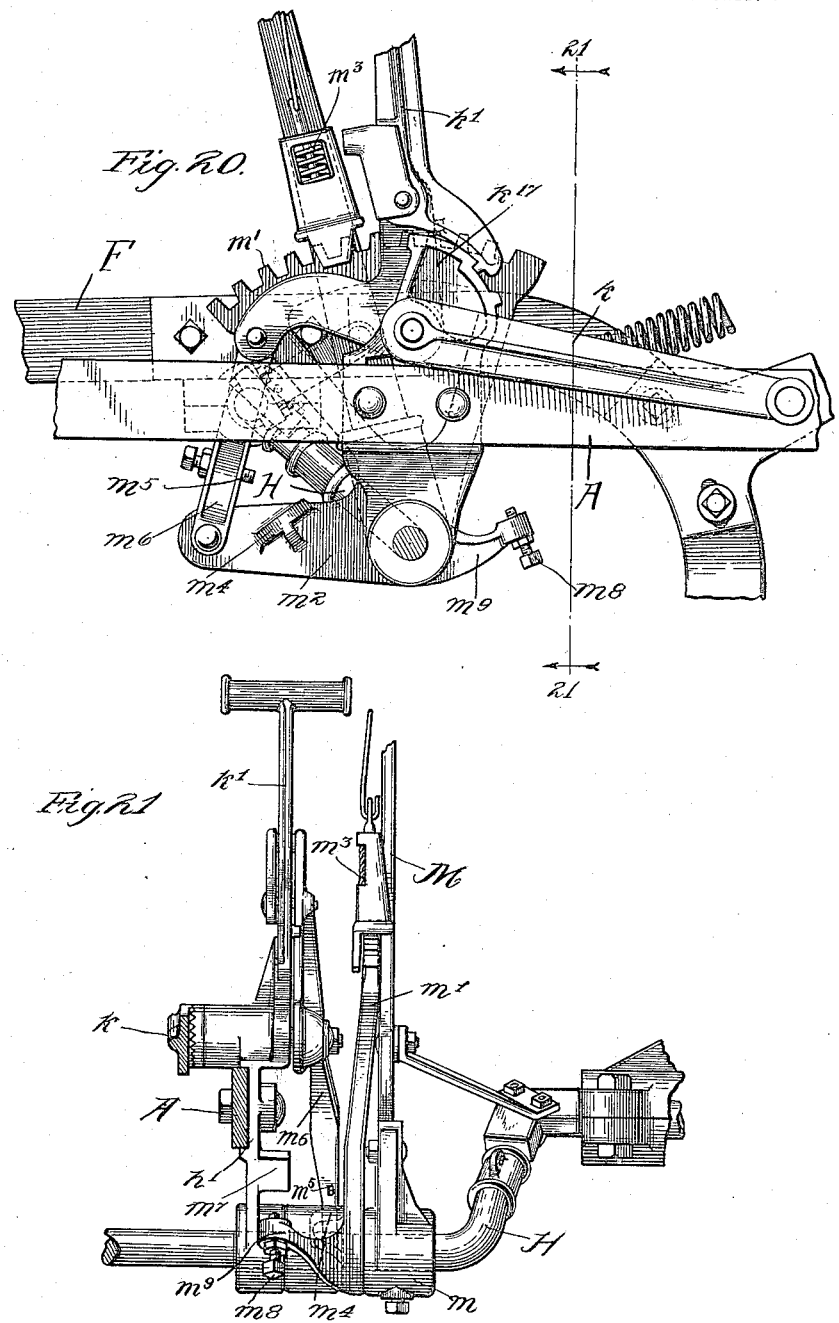

UNITED STATES PATENT OFFICE.

ALVARO S. KROTZ, OF JANESVILLE, WISCONSIN, ASSIGNOR TO THE JANESVILLE MACHINE COMPANY, OF JANESVILLE, WISCONSIN, A CORPORATION OF WISCONSIN.

WHEELED IMPLEMENT.

1,215,818. Specification of Letters Patent. Patented Feb. 13, 1917.

Application filed June 6, 1914. Serial No. 843,324.

*To all whom it may concern:*

Be it known that I, ALVARO S. KROTZ, a citizen of the United States of America, and resident of Janesville, Rock county, Wisconsin, have invented a certain new and useful Improvement in Wheeled Implements, of which the following is a specification.

My invention relates to wheeled plows, listers or other similar wheeled implements in general, but more particularly to that type of wheeled implement which has a foot lift mechanism for raising and lowering the plow or other implement, and in which some provision is necessary for varying the depth of the furrow.

Generally stated, the object of my invention is to provide a foot lift wheeled implement with novel and improved means for supporting the plow or similar implement for up and down movement in the frame which is carried by the wheels, and for controlling the depth at will.

A special object is to provide a novel construction and arrangement whereby the plow or other implement, although capable of yielding when an obstruction is encountered, will ride steadily in the ground and not rise when there is no necessity thereof.

Another object is to provide a novel construction and arrangement whereby the plow or similar implement will have the proper angle (commonly known as "suck") while in the ground, and whereby the depth can be changed at will, the said angle being always sufficient to keep the point of the plow below the heel thereof.

A further object is to provide a novel and improved construction whereby the foregoing and other desirable objects are attained in a wheeled plow or similar implement having no special means for leveling the frame by adjustment of one or more of the wheels relative thereto, and whereby the plow is level, or practically level, at all times except when entering the ground, notwithstanding the absence of any special leveling arrangement, such as hand levers commonly employed for adjusting the land side and front furrow wheels, and notwithstanding the provision of means in addition to the foot lift for regulating the depth at will.

It is also an object to provide certain details and features of construction and combinations tending to increase the general efficiency and serviceability of a wheeled plow or similar implement of this particular character.

To these and other useful ends, my invention consists in matters hereinafter set forth and claimed.

It will be seen that my invention is in the nature of an improvement on the plow shown in my prior application No. 790,487, to which this application is subordinate.

In the accompanying drawings—

Figure 1 is a side elevation of a wheeled plow embodying the principles of my invention, showing certain portions thereof in section, and with certain other features omitted for convenience of illustration, the plow being shown in raised or carrying position, and the three wheels being indicated as traveling on the surface of the ground, whereby the frame of the machine is practically level.

Fig. 2 is a similar view showing the plow down and operating at minimum depth, the land side wheel being indicated as traveling on the surface of the ground, and the front and rear furrow wheels being shown running in the previous and new furrow, respectively, the frame being practically level at this time also.

Fig. 3 is a plan of said wheeled plow, showing the different elements in the positions which they occupy when the plow is operating at maximum depth.

Fig. 4 is a diagram showing the positions of the plow and wheels when the plow is entering the ground.

Fig. 5 is a similar view showing the plow operating at maximum depth.

Fig. 8 is a similar view showing the plow operating at minimum depth, the frame and plow bottom being level at this time also, whereby the wing of the plow is down in proper position for making a practically level furrow trench.

Fig. 9 is a similar view showing the plow at maximum depth, the frame and plow bottom now being tilted somewhat in the opposite direction, but the wing of the plow being still in position to give practical results.

Fig. 10 is a diagram, on a larger scale, showing the various positions of the front and rear bails, necessary or desirable for the different positions of the plow, and for maintaining the proper degree of "suck" at all times.

Fig. 11 is a similar diagram showing the corresponding positions of the plow.

Fig. 12 is a section on line 12—12 in Fig. 3.

Fig. 13 is a section on line 13—13 in Fig. 3.

Fig. 14 is an enlarged section on line 14—14 in Fig. 3.

Fig. 15 is a vertical section on line 15—15 in Fig. 14.

Fig. 16 is a section on line 16—16 in Fig. 14.

Fig. 17 is a plan of the rear bail mechanism shown in Figs. 14, 15 and 16.

Fig. 18 is a section on line 18—18 in Fig. 19, showing another form of the depth regulating lever mechanism.

Fig. 19 is a section on line 19—19 in Fig. 18.

Fig. 20 is an enlarged side elevation of another form of said depth regulating mechanism.

Fig. 21 is a section on line 21—21 in Fig. 20.

Figure 6:
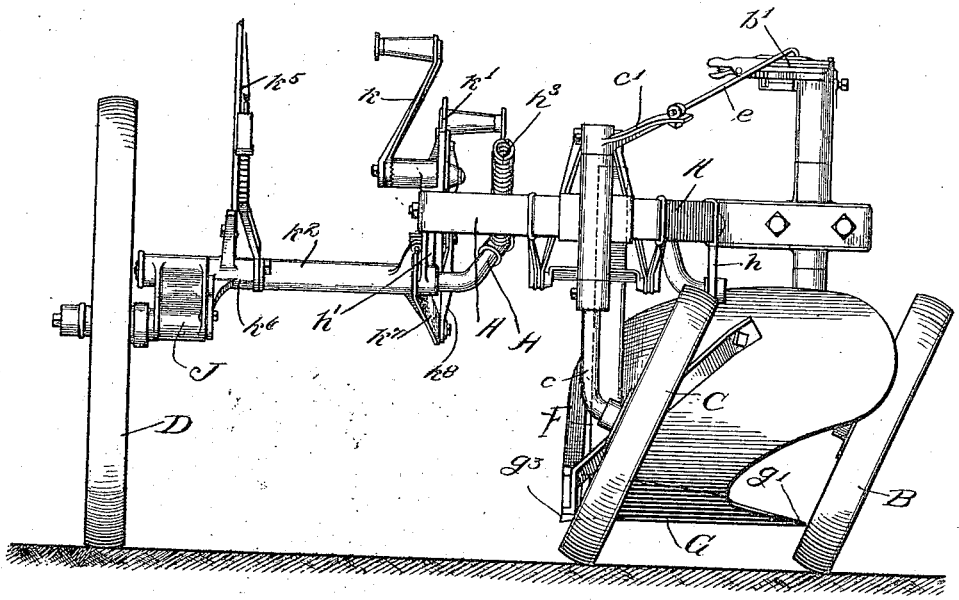
Fig. 6 is a rear elevation of said wheeled plow, showing the position of the parts when the plow is raised above the ground, the frame and plow bottom being practically level at this time.

As thus illustrated, my invention comprises an open frame A of any suitable form and construction, said frame being supported by the usual front and rear furrow wheels B and C, and by the usual land side wheel D, the said front and rear wheels being in the nature of caster wheels. The said front wheel is mounted on the lower outturned end of the vertically disposed spindle $b$, which spindle is mounted to turn in suitable bearings on the frame, and is controlled by the tongue E through the medium of the usual or any suitable connection. A vertically disposed spindle $c$ is provided for the rear furrow wheel, said spindle being mounted to turn in suitable bearings on the rear end of the frame. It will also be seen that the spindles $b$ and $c$ are provided at their upper ends with arms $b^1$ and $c^1$, and that these arms are connected by the usual and well known rod $e$, whereby the said tongue exercises a certain amount of control over the rear wheel also. The said front and rear furrow wheels are preferably inclined outwardly—that is to say, in a direction away from the land side wheel, in the usual and well known manner. A plow beam F is provided with a plow G of any suitable known or approved form, having a point $g$, a wing $g^1$, a mold board $g^2$, and a land side $g^3$, the latter having the heel $g^4$ thereof disposed in the usual or any suitable position at some distance in rear of the said point. A front bail H is mounted to turn in bearings $h$ and $h^1$ disposed at opposite sides of the frame, A, and the offset portion of the bail is mounted to turn in a bearing $h^2$ carried by the plow beam, whereby the rotation of said bail serves to raise and lower the plow in the usual and well known manner. A spring $h^3$ connects the bail with some suitable portion of the frame and serves to assist the operator in raising the plow from the ground, and then holds the plow in raised position—that is to say, in the carrying position which the plow occupies while not in use. The construction so far described is old and well known and the illustration and explanation thereof indicate the general type of plow to which my invention relates.

The rear bail mechanism I is in the nature of a modification or an improvement of or upon the rear bail mechanism shown and described and claimed broadly in my said prior application. In this case the bail I is preferably of some width, and the lower ends thereof are pivoted on the brackets $i$ on the frame. The upper end of said bail has pivoted thereon a depending link $i^1$, and this link is in turn pivotally connected at $i^2$ with the arm $i^3$ on the plow beam. A set screw $i^4$ on the bail engages a stop $i^5$ on the link, and the said set screw and stop are yieldingly held in engagement by the spring $i^6$ which connects the lower end of the bail with any one of the series of holes $i^7$ provided along the lower and rear edge of the link $i^1$, whereby the tension of the spring may be adjusted when such is necessary or desirable. In the ordinary operation of the plow the bail I and its link $i^1$ move up and down as one rigid piece and without any relative movement between them. In Fig. 2 the plow is shown down in the ground and working at minimum depth. Should the point of the plow at this time encounter an obstruction, the heel of the plow will be tilted upward, the spring $i^6$ yielding to permit the necessary forward swing of the link $i^1$ relative to the bail. This movement of said link is limited by the projection $i^8$ on the upper end of said link, said projection engaging the stop $i^9$ on the bail, whereby the tilting motion of the plow is limited. The said spring serves, therefore, to hold the heel of the plow down, and only yields when it is actually necessary for the heel of the plow to rise, whereby the plow rides steadily in the ground and without undesirable vibration thereof.

In operation, the point of the plow enters the ground first, when the plow is lowered, and the point is then maintained below the heel at all depths below the surface of the ground. Also, and in accordance with the theory of my present invention, the plow does not leave the ground point first, when the frame is level but to the contrary leaves the ground in the same position—that is to say, at the same angle at which it entered. Prior to my invention, it has usually been considered that to have the plow leave the ground point first, so that it virtually rides out of the ground, was the best practice. It will be seen, however, that this is objectionable to some extent, as in raising the plow while standing still the upward tilt of the point before leaving the ground compels the operator, very often, to lift a heavy mass of earth on the plow; whereas if the point of the plow is tilted downward when this occurs, as is true of my invention, and as herein shown and described, the earth resting on the plow will slide readily off, and the plow will rise more easily. In practice, and with the construction shown, the plow may be raised from the ground while moving along, and without very much difficulty, notwithstanding that it does not ride out point first. To accomplish this, it will be seen that the front and rear bails H and I are so relatively disposed to each other, and are so constructed and applied, that the only time at which the point of the plow is higher than the heel thereof is when it is raised above the ground (see Fig. 1.).

Figure 7:
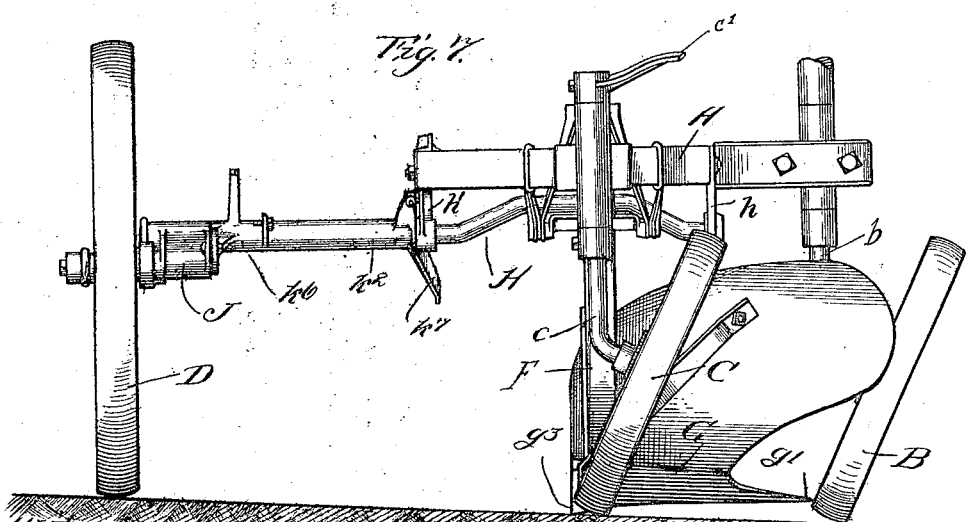
Fig. 7 is a similar view showing the plow entering the ground, the frame and plow bottom being tilted to one side at this time, whereby the wing of the plow is raised somewhat above the land side thereof.

Of course, and if the plow is raised just after the front furrow wheel begins to travel out of the end of the furrow, at which time the frame is raised in front, the plow will then come out of the ground point first, because the rear furrow wheel is still on the bottom of the furrow. This might also occur when the front furrow wheel passes over an obstruction, for at such time it might be necessary to raise the plow; but under such conditions the lifting of the point is not brought about by the mechanism on the frame, but by the movement of the frame. At other times it is impossible for the point of the plow to rise above the heel, and consequently the so-called "suck" of the plow (the distance of the heel above the point) remains practically constant while the plow is in the ground. In practice the proportions are such, for example, that when the plow is entering the ground, as shown in Fig. 4, the "suck" is then $\frac{7}{16}$ of an inch. When it reaches minimum depth, say 4½ inches below the ground, the "suck" is then approximately $\frac{3}{8}$ of an inch, as shown in Fig. 2; and then when the plow reaches maximum depth, say 7½ inches, the "suck" is then approximately $\frac{1}{16}$ of an inch; but it will be understood that these figures are not arbitrary, but merely illustrative, and that should the plow be made either larger or smaller, or should the proportions of the parts be changed, either greater or less "suck" will then be obtained. In Fig. 10 the different positions of the front and rear bails are shown, and in Fig. 11 the corresponding positions of the plow are shown, it being understood that the highest position indicates the conditions when the plow is out of the ground; that the second or next lower position shows the plow entering the ground; that the next or third position illustrates the relative positions necessary for the two bails when the plow is working at minimum depth, and that the fourth or lowest position illustrates what is necessary when the plow is working at maximum depth. By referring to Figs. 6 to 9, inclusive, it will be seen that the plow frame and plow bottom, and in fact the entire structure of the wheeled plow, have a tilting action or motion from one side to the other, and then back again, during the raising and lowering of the plow. For example, Fig. 6 shows the relative positions of the parts, and the position of the wheeled structure as a whole, when the plow is out of the ground and in the position shown in Fig. 1. At this time, the frame A is practically level, and the plow bottom is also practically level, it being observed that the wing $g^1$ and the land side $g^3$ are practically in the same horizontal plane. Fig. 7, however, illustrates the manner in which the frame and plow are tilted over to the left when the plow reaches the position shown in Fig. 4, and at such time the wing $g^1$ is some distance above the land side. In Fig. 8 the plow has assumed the position necessary for minimum depth, as shown in Fig. 2, and at this time the frame A and the plow bottom are practically level, the wing $g^1$ being at this time in substantially the same horizontal plane as the land side, or only slightly above. In this way, the furrow trench will have a level bottom, and satisfactory plowing conditions are insured. Fig. 9 shows the plow working at maximum depth, as shown in Fig. 5, and at this time the frame and plow bottom are tilted somewhat to the right, so that the wing $g^1$ of the plow may be slightly below the land side; but this does not in any way interfere with the proper working of the plow. It will be seen, therefore, that in proportioning the parts, especially the front and rear bails, with a view to insuring the previously described mode of operation, involving the dip of the point of the plow below the heel thereof at all times when the plow is in the ground, the side tilt of the plow must be taken into account, as it is equally important to have the wing of the plow maintained on a level with the point for all working positions thereof. This, it will be seen, is accomplished in a large measure by the proper positioning of the offset axle arm J on the outer end of the bail, whereby the sidewise and horizontal tilting action or motion of the plow is of the proper character to insure a practically level condition of the plow bottom when in working position.

It will be observed that the plow bottom and beam hang on two pivots, towit:—the bail H as the front pivot, and pivot 12 at the rear. The front pivot moves downward more than the rear as the plow is set below the minimum depth. This causes the horizontal tilt which assists in preventing the wing from dropping below the point; in other words, keeps the wing practically on a level with the bottom of the front furrow wheel. (See Figs. 8 and 9.) Referring to Fig. 9, the plow point in relation to the frame is lower than in Fig. 8, but the wing is in practically the same position in both figures, so that the furrow remains practically level because the landside part of the frame is a little higher. An increase in depth is, of course, the result of the coöperation of the several movements already described.

The foot lift mechanism K by which the plow is raised and lowered, shown in Fig. 3, is the same as that shown and described in said prior application. It comprises a lifting foot lever $k$ for raising the plow out of the ground, and a second foot lever $k^1$ for pushing the plow downward against the tension of the spring $h^3$ when it is desired to have the plow enter the ground. The said mechanism is connected with the offset land side wheel axle arm J by means of a sleeve $k^2$, which is loose on the straight portion of the bail, and which is rigid with the rack $k^3$, said rack being engaged by the locking bolt $k^4$ on the hand lever $k^5$, said lever having a sleeve or casting $k^6$ which is keyed or otherwise fastened to said bail. The other end of said sleeve $k^2$ is provided with an arm $k^7$ which is pivotally connected with a link $k^8$, said link being in turn pivotally connected with the arm $k^9$ of the foot mechanism. The arm $k^{10}$ is rigid with a short shaft or journal $k^{11}$ which is mounted to turn in the upper end of a bracket bearing $h^1$, previously referred to, and the depressing lever $k^{12}$ is pivoted at $k^{13}$ upon the arm $k^{10}$, being provided with a toothed portion $k^{14}$ for engaging either the notch $k^{15}$ or the notch $k^{16}$ in the segment or rack $k^{17}$, the latter being rigid with the bracket bearing $h^1$ which is secured to the frame. Relative movement between the arm $k^{10}$ and the foot lever $k^{12}$ is limited by the stop $k^{18}$ on said arm and the stop $k^{19}$ on said lever. In this way, and by downward pressure on the foot piece $k^{20}$ of said depressing lever, the toothed portion $k^{14}$ may be disengaged from either of said notches $k^{15}$ and $k^{16}$, depending upon whether the plow is to be raised or lowered; and if it is desired to lower the plow, continued pressure on the foot piece $k^{20}$ will overcome the tension of the spring $h^3$ and bring the plow down to the ground. Thus it will be seen that the depressing foot lever $k^1$ is, in its entirety, composed of the arm $k^{10}$, the pivoted lever $k^{12}$, and the foot piece $k^{20}$, whereby the said foot lever is also employed for automatically locking the plow in either its raised or its lowered position, and of unlocking the same merely by foot pressure thereon. The lifting foot lever $k$ is also rigid with the short shaft or journal $k^{11}$, and downward pressure on the foot piece $k^{21}$ of this lever will cause the arm $k^9$ to rise, and in this way the link $k^8$ will lift the arm $k^7$, thereby rocking the bail H and causing the plow to rise. This, it will be seen, is by reason of the fact that the sleeve $k^2$ is locked to the bail through the medium of the rack $k^3$ and the hand lever $k^5$; and for the further reason, it will be seen, that the offset axle arm J is rigidly secured to the hand lever sleeve or hub $k^6$, whereby the land side wheel D is depressed, relative to the plow frame, at the same time that the plow is being raised. As explained in said prior application, the depth may be changed at will by disengaging the hand lever $k^5$ from the rack $k^3$, and by adjusting it to different positions along said rack, thereby changing the relative positions of the bail H and the sleeve $k^2$, and thus permitting the plow when released by the foot lift mechanism to drop down to a greater or less depth, depending upon the depth of furrow desired; and if sufficient depth cannot be obtained this way, then the adjustable connection $j$ can be manipulated to change the relative positions of the arm J and the hand lever sleeve $k^6$, in the manner described in said prior application, (the arm J has a sleeve $j^1$ which is loose on the end portion of the bail, this sleeve being integral or otherwise rigidly united with the upper end of said arm,) thereby permitting the plow to go a little deeper into the ground; but for ordinary purposes the hand lever $k^5$ is entirely sufficient for regulating the depth. It will be observed, also, that all of this is accomplished without in any way disturbing the front and rear furrow wheels, and without any special provision for leveling the plow, the leveling being a matter which is practically allowed to take care of itself.

All that is necessary, therefore, is simply to raise and lower the plow by means of the foot lift mechanism, and to vary the depth by means of the hand lever $k^5$; and during such times the rear bail mechanism I coöperates with the front bail H to keep the point of the plow below the heel thereof, while the plow is in the ground, and at the time that it enters the ground, in the manner previously described.

In Figs. 18 and 19 the hand lever L corresponds to the hand lever $k^5$ previously described, but in this case the said lever is rigid with a sleeve $l$ which is loose on the bail H, and the offset axle arm $l^1$ is rigid with said sleeve. The sleeve $k^2$ is the same as the one previously described, and is rigid with the rack $k^3$, this rack being engaged by locking means $l^2$ on the lever, it being understood that the said locking means may be of any suitable character, and are operated by the pivoted hand piece $l^3$ mounted near the top of said lever. The rack $l^4$ is rigidly secured to the sleeve $l^5$ on the bail, said sleeve being keyed or fixed on the bail in any suitable manner. The lever L is provided with locking means $l^6$ for locking the lever at different points along the rack $l^4$, said means being operated by the pivoted grip $l^7$ at the top of the rack. By operating the hand piece $l^3$ and rocking the lever L, and thus rocking the bail H, the depth of furrow can be changed at will, in the manner previously described. With this construction (Figs. 18 and 19), the sleeve $l$ is rigid with the offset axle and loose on the bail. Said sleeve $l$ has an adjustable connection through the rack or segment $k^3$ with the foot-lift mechanism, and another adjustable connection through the rack $l^4$ with the bail, so that the said connection between the sleeve and foot-lift does not include the rack $l^4$ and locking device $l^6$ by which the position of the offset axle arm is changed by rotation thereof on the bail. By operating the hand piece $l^7$, thereby disengaging the locking means $l^6$ from the rack $l^4$, the relation of the offset axle arm $l^1$ to the bail H may be changed or varied, within limits imposed by the length of the rack $l^4$, and for the purpose of leveling the plow or slightly increasing the depth of the furrow, should such become necessary or desirable. Thus, and with this arrangement substituted for the construction shown in Figs. 3, 12 and 13, the single lever L is sufficient for both purposes, and controls not only the relative positions of the bail H and sleeve $k^2$, but also the relative positions of the land side wheel axle arm and the bail.

As shown in Figs. 20 and 21 the foot lift mechanism is substantially the same as that shown in Figs. 3, 12 and 13, but in this case the depth regulating lever M is disposed inside of the frame A, and is secured to the bail H by a casting $m$ keyed or otherwise secured thereto. The rack $m^1$, which is the equivalent of the rack $k^3$ previously described, is also disposed inside of the frame, being loosely mounted on said bail, and is rigid with the arm $m^2$, which latter is the equivalent of the arm $k^7$ previously described. The lever M has a device $m^3$ for locking or latching it in different positions along the rack $m^1$, and the operation with this construction is substantially the same as that described in connection with Figs. 3, 12 and 13, when it is desired to raise and lower the plow or vary the depth of the furrow. The arm $m^2$ has a stop $m^4$ which is engaged by the adjustable set screw $m^5$ on the link $m^6$, which latter is the equivalent of the link $k^8$ previously described. It will also be understood that in this case the foot lever $k$, shown in Figs. 20 and 21, and also the foot lever $k^1$, are exactly the same as those previously described, which is also true of the rack $k^{17}$ that coöperates therewith. With the construction shown in Figs. 20 and 21, involving the placing of the depth regulating lever inside of the frame, it will be understood that any suitable means can be employed for securing the land side wheel D and its offset axle arm to the bail, adjustably or otherwise, depending upon the circumstances and requirements of any particular case. Also, the bracket $h^1$ may be provided with a stop $m^7$ for engaging the adjustable set screw $m^8$ carried by the arm $m^9$, which latter is rigid with the rack $m^1$, whereby the weight of the plow is on the stop $m^7$, when the plow is down, instead of on the link $m^6$ of the foot lift mechanism. With this provision, the plow rides steadily in the ground, notwithstanding any looseness or lost motion in the foot lift mechanism; and it will also be understood that this provision can be used on the foot lift mechanism shown in Figs. 3, 12 and 13, as explained in said prior application.

As a matter of further and special improvement a spring may be interposed between the bail H and the offset axle arm of the land side wheel D whereby the bail may turn slightly relative to the said axle arm, in a direction permitting the plow to rise slightly while in the ground, the said spring yielding slightly for this purpose. For example, and as shown in Figs. 18 and 19, the rack sleeve $l^5$ may itself be loose on the bail and secured thereto through the medium of the collar $l^8$ which is keyed or otherwise fastened to the bail, and which is provided with an arm $l^9$ integral therewith. A lug $l^{10}$ on the sleeve $l^5$ is provided with a bolt or short rod $l^{11}$ provided with a shoulder $l^{12}$ at the end thereof. It will be understood that the frame and other structural elements are arranged to permit free up and down motion of the plow beam in the manner previously described, and without interfering therewith. A spring $l^{13}$ is interposed between the arm $l^9$ and the shoulder $l^{12}$, and is subject to compression by any slight rotation of the bail H when the plow attempts to rise while in the ground. Thus, and by means of the spring $l^{13}$, the plow is in a certain sense yieldingly held in the ground. It is obvious, of course, that this spring device can be applied to the construction shown in Figs. 3, 12 and 13, and is not restricted to any particular arrangement of the depth regulating lever.

It will be understood that the draft appliance N at the end of the plow beam F may be of any suitable form or construction. Also, the seat O for the driver may be supported in any suitable manner upon the rear end of the frame A, as is usual in wheeled plows of this character. As shown, the plow beam moves up and down in the arch P on the front of the frame, in the usual and well known manner.

Thus the plow frame A has a fixed position on the standards $b$ and $c$—that is to say, remains at a fixed height thereon. It is true, as previously explained, that the wheel B is controlled by the tongue E, and that the wheel C is controlled by the tongue through the rod $e$, the latter engaging in a slot $b^2$ in the arm $b^1$ whereby the standard $c$ (or spindle) is held against turning while the plow is moving straight ahead, but is free to turn and allow the wheel C to "caster" more or less while the plow is turning around; for while the tongue is swinging to one side the end of the rod $e$ is then free to slide in the slot $b^2$, being yieldingly held in the position shown by the spring $b^3$, in the usual and well known manner. Otherwise, however, there is no control exercised over said wheels B and C, as the driver is not at any time capable of shifting the frame A on either of said wheels, there being no provision for this purpose; and one of the theories of my invention is that good results may be obtained in a foot lift plow of this kind without shifting the frame up and down on the front furrow wheel. Although provided with a foot lift mechanism by which the plow is raised and lowered in the frame, it is possible, by means of the depth regulating mechanism, to change the depth at will, by simply rocking the front bail, and by in effect adjusting the connection between the foot lift and the said bail; and not only is it possible to thus instantly change the distance of the plow below the frame, and to thereby change the depth of the furrow without shifting the frame on the front furrow wheel, but also to maintain the plow point below the heel of the plow in a manner tending to insure good results; and, furthermore, the relative arrangement of the bail H, the offset axle J, the rear bail I and the link $i^1$ is such that the bottom of the furrow is always practically level for any depth. While the plow is in the ground, and while the front and rear furrow wheels are traveling in the same horizontal plane, the heel of the plow cannot fall below the point, as the link $i^1$ and bail I are locked against relative movement in one direction by the stop $i^4$, which is adjustable for the different conditions, and whereby the front end of the plow beam cannot tilt upward when the plow is in the ground. In a plow of this kind, the rear furrow wheel always travels on a level with the point and wing of the plow, and after the plowing is fully started the front furrow wheel does the same thing. In operation, the point of the plow is maintained level with the bottom of the furrow wheels by reason of a slight lifting of the land side of the frame, because the land side wheel offset axle does not raise the land wheel to an extent equal to the change in depth. This would throw the plow out of level, except for the fact that the point moves down much faster than the wing, the wing being nearly as far to the rear as the heel of the land side; and the increased "suck" keeps the wing up nearly level with the point for all depths. Now if the user always had a furrow to start with, of proper depth, and never desired to change the depth suddenly, or to any extent, all any plow would need would be a fixed position for the bottom and a lever adjustment on the offset which would answer for any depth within the range of the offset adjustment, and the depth of furrow would always be the height of the land wheel above the level of the furrow wheels and plow bottom. In practice, however, the user wants to clear the ground several inches, when the plow is above ground, with wheels all on a level, and sometimes with both furrow wheels in a furrow. Again, a user frequently wants to plow five or six inches deep with all wheels on the surface of the ground as in starting or making a back furrow; therefore, a lever is commonly used on the front furrow wheel, and then the trouble comes about when the operator begins to level up the plow after the first furrow is made, or after a change of depth is made; for in such case the wing is either above or below the bottom side of the front furrow wheel, and the desired depth of furrow is then secured by operating the land wheel offset bracket lever; but my improved construction automatically levels the plow when the desired depth is secured, and as this depends upon the operation of only one lever, the operation is comparatively easy. There is a slight change in level, as shown, but it is comparatively slight, and the maximum change is less than the adjustment between two notches of the old front furrow wheel lever arrangement, so that it would be impossible to get as good results with the old and well known two-lever arrangement. With my improved construction the bottom tilts on the point as it is lowered, to keep the furrow practically level, and the foot lift is connected directly to a rack or ratchet and lever connected in turn directly to the bail and offset, whereby the foot-lift operates the bail through the ratchet and hand lever, and the hand lever controls the plow bottom and offset axle through the bail; and adjustable means (such as $j$ in Fig. 13, or the rack $l^4$ in Fig. 18) are provided between the bail or lever and the offset axle bracket, whereby variations in manufacture can be taken care of, and also for the further purpose of taking care of extreme conditions, such as a greater difference in depth (Indiana standard is eight inches or nine inches, while in Kansas it is but four inches; and for Kansas it might be advisable to raise the land wheel two inches by means of this adjustment.) The wing $g^1$ of the plow, when viewed from above, extends beyond a straight line drawn directly from the bottom of the front wheel B to the bottom of the rear wheel C, and if the frame is tilted it tilts on this line and changes the wing slightly; and for this reason a perfectly level furrow is hardly possible with the two extreme depths, and while the difference is slight some users may require this additional adjustment.

With the construction shown and described, all the operator needs to do is to find the desired depth. On the two-lever plow, however, of the well known kind having a front furrow wheel lever, the operator must find the depth and also level the plow. Now if the operator gets the depth first and then tries to level the plow by either one of the two levers, that will change the depth; and if the operator levels the furrow first and gets the depth afterward, with either lever, that very likely changes the level. It is, therefore, necessary to operate both levers for either adjustment, in the plow mentioned, and the result is the depth desired with the furrow out of level unless the plow is in the hands of an expert. In other words, the depth is secured at the expense of the level of the furrow; but with the construction herein shown and described the plow levels itself at the expense of the depth. In other words, and with the new construction shown and described, the leveling is secured at the expense of the depth, because while it may not be plowing the depth desired, whatever depth it does plow it will be level. The first furrow opened on the level might be four inches deep, and the next might be five inches deep; the front furrow wheel running in the four inch furrow; but if there is no further change in the depth lever after the plow has made two or three more furrows, it would then seek a fixed depth, say 5 and one-half inches, and the furrow would be level. It is, therefore, evident that the only responsibility imposed on the operator is the question of depth. With the plows heretofore employed, and under the same conditions, after the plow had found its depth it would be liable to be very much out of level, and the operator would not be able to readily correct it with either one of the two levers, for in operating both levers of such a plow there is always a tendency to obtain the depth wanted without improving the level of the furrow. But with my invention the operator merely raises and lowers the plow, using the hand lever to regulate the depth, and the leveling takes care of itself.

Also, and with my improved construction, the rear bail mechanism can be regulated, by adjusting the set screw $i^4$, to change the working angle or "suck" of the plow at will. For example, and by tightening said screw, the link $i^1$ will be forced forward and upward, thereby lifting the heel of the plow slightly, and thus increasing the "suck" or forward tilt of the plow. A loosening of said screw will, therefore, reduce the "suck," allowing the heel to settle slightly. Thus the proper working angle of the plow, or dip of the point below the heel, is controlled by the rear bail mechanism and when determined or found is then maintained by the relative arrangement of the front and rear bails.

What I claim as my invention is:—

1. A wheeled plow having a frame, a beam provided with a plow-bottom rigid therewith, a front bail journaled on the frame to support said beam, devices mounted on the frame to support the rear end of said beam, mechanism for rocking said bail to raise and lower the beam and plow-bottom, and instrumentalities including a hand lever for rocking said bail to vary the working depth and keep the plow level, said devices comprising means for permitting the beam to tilt upward at the rear end thereof, in all positions of said bail, and for preventing the front end of the beam from tilting upward relative to said frame.

2. In a wheeled implement, a frame, front and rear furrow wheels for supporting said frame at a fixed height thereon, a bail on said frame, a plow carried on said bail, a land side wheel for said bail, a rear support for said plow, said support being movably connected with said frame, means for precluding the point of the plow from tilting above the heel while in the ground, said means being carried on said support, mechanism for rocking said bail to raise and lower the plow, and devices on the bail for rocking the same to change the depth, said land side wheel having an offset axle serving by the rocking of said bail to tilt the entire wheeled implement sidewise.

3. In a wheeled implement, a frame, front and rear furrow wheels for supporting said frame at a fixed height thereon, a bail on said frame, a plow carried on said bail, a land side wheel for said bail, a rear support for said plow, said support being movably connected with said frame, means for precluding the point of the plow from tilting above the heel while in the ground, said means being carried on said support, mechanism for rocking said bail to raise and lower the plow, devices on the bail for rocking the same to change the depth, said land side wheel having an off-set axle, and means for adjustably mounting said axle on said bail.

4. A wheeled plow having a frame, a beam provided with a plow-bottom rigid therewith, a front bail journaled on the frame to support said beam, devices mounted on the frame to support the rear end of said beam, mechanism for rocking said bail to raise and lower the beam and plow-bottom, and instrumentalities including a hand lever for rocking said bail to vary the working depth and keep the plow level, said devices comprising means for permitting the beam to tilt upward at the rear end thereof, in all positions of said bail, and for preventing the front end of the beam from tilting upward relative to said frame, having a spring to yieldingly resist said upward tilting of the beam at the rear end thereof.

5. In a wheeled implement, a frame, front and rear furrow wheels for supporting said frame at a fixed height thereon, a bail on said frame, a plow carried on said bail, a land side wheel for said bail, a rear support for said plow, said support being movably connected with said frame, means for precluding the point of the plow from tilting above the heel while in the ground, said means being carried on said support, mechanism for rocking said bail to raise and lower the plow, and devices carried on said bail and arranged for rocking the bail to change the depth.

6. In a wheeled implement, a frame, front and rear furrow wheels for supporting said frame at a fixed height thereon, a bail on said frame, a plow carried on said bail, a land side wheel for said bail, a rear support for said plow, said support being movably connected with said frame, means for precluding the point of the plow from tilting above the heel while in the ground, said means being carried on said support, mechanism for rocking said bail to raise and lower the plow, and devices carried on said bail and arranged for rocking the bail to change the depth, said means being adjustable to vary the position of the plow point below the heel.

7. In a wheeled implement, a frame, front and rear furrow wheels for supporting said frame at a fixed height thereon, a bail on said frame, a plow carried on said bail, a land side wheel for said bail, a rear support for said plow, said support being movably connected with said frame, means for precluding the point of the plow from tilting above the heel while in the ground, said means being carried on said support, mechanism for rocking said bail to raise and lower the plow, devices carried on said bail and arranged for rocking the same to change the depth, and a spring connected and arranged for yieldingly holding the plow down at the heel thereof, applied to said means.

8. In a wheeled implement, a frame, front and rear furrow wheels for supporting said frame, a bail on said frame, a plow carried on said bail, a land side wheel for said bail, an offset axle for said land side wheel, a hand lever arranged for rocking said bail to vary the depth of the furrow and to keep the bottom of the furrow level, a yielding connection between said lever and axle, mechanism for rocking said bail to raise and lower said plow, an adjustable connection between said lever and mechanism, and a rear support coöperating with said bail to govern the position of said plow for all adjustments of said connection.

9. In a wheeled implement, a frame having wheels, a bail mounted to turn in bearings on said frame, a beam on said bail, foot-lift devices arranged on said frame and connected for rocking said bail to raise and lower said beam, a wheel connection for said bail, a ground implement on said beam, provided with a forward point and a rear heel, and a rear beam supporting mechanism carried on said frame a distance behind said bail and arranged to coöperate with said bail for causing said implement to enter and leave the ground with said heel higher than said point, when the frame is level, said mechanism coöperating with said bail to keep the point lower than the heel while in the ground, and means for adjusting the connection between said bail and said devices and varying the working depth without bringing the point above the heel.

10. In a wheeled implement, a frame, a bail on said frame, an implement beam on said bail, a foot-lift mechanism on said frame, an offset axle at the outer end of said bail, a land side wheel on said axle, a sleeve rigid with said axle and loosely mounted on said bail, a connection between said sleeve and mechanism, said connection being adjustable for varying the working depth of said implement, thereby to change the depth without adjustment of the foot-lift, an adjustable connection between said sleeve and bail, and means providing a rear support for said beam and coöperating with said bail to maintain the implement in working position for all adjustments of said connection.

11. In a wheeled implement, a frame, a bail on said frame, an implement beam on said bail, a foot-lift mechanism on said frame, an offset axle at the outer end of said bail, a land side wheel on said axle, a sleeve rigid with said axle and loosely mounted on said bail, a connection between said sleeve and mechanism, said connection being adjustable for varying the working depth of said implement, thereby to change the depth without adjustment of the foot-lift, an adjustable connection between said sleeve and bail, and rear supporting means coöperating with said bail to maintain the implement in working position for all adjustments of said connection, said last mentioned connection having a spring arranged to yieldingly hold the implement down.

12. In a wheeled implement, a frame, a bail on said frame, an implement beam on said bail, a foot-lift mechanism on said frame, an offset axle at the outer end of said bail, a land side wheel on said axle, a sleeve rigid with said axle and loosely mounted on said bail, a connection interposed between said sleeve and mechanism, said connection being adjustable for varying the working depth of said implement, thereby to change the depth without adjustment of the foot-lift, serving to keep the bottom of the furrow level, an adjustable connection between said sleeve and bail, rear supporting means coöperating with said bail to maintain the implement in working position for all adjustments of said connection, and a hand lever suitably supported on the bail and having means for controlling said first mentioned connection.

13. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, and an adjustable stop for engaging said link while the implement is in operation, carried on said element, serving to regulate the working angle of the implement.

14. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, a stop disposed in position for engaging said link while the implement is in operation, and a spring arranged for yieldingly holding the link against said stop.

15. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, a spring connecting the link and element together, serving to yieldingly hold the same in relative position, and means for varying the degree of resistance offered by said spring to movement of the link relative to said element.

16. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, and a spring applied to said mechanism and arranged to yieldingly hold the implement down at the rear thereof while in operation.

17. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, a spring arranged for controlling said mechanism and to yield when the implement encounters an obstruction, and means for adjusting said spring.

18. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, a stop on said element, serving to limit the backward swinging of said link, and a spring extending under said stop to connect said element with the lower portion of said link.

19. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, and a link depending from the forward end of said element, said link having its lower end pivotally connected with said bracket, said mechanism having means for regulating the working angle of said implement.

20. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, said implement comprising a plow, and said mechanism having a screw for the adjustment thereof to raise and lower the heel of said plow.

21. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, said implement comprising a plow on said beam, and said mechanism having a spring applied to said link and arranged to yieldingly hold the heel of the plow down in the ground.

22. In a wheeled implement, a frame provided with a bail, wheels therefor, an implement beam disposed in position to move up and down in the frame, means supported on said frame for raising and lowering said beam, a connection between said means and bail, wheel connection for said bail, rear supporting mechanism for said beam, including an element provided with front and rear ends, having its rear end pivotally supported on the frame, a bracket on the beam, a link depending from the forward end of said element, said link having its lower end pivotally connected with said bracket, said implement comprising a plow on said beam, and a spring connected and arranged for yieldingly holding the heel of the plow down in the ground.

23. In a wheeled implement, a frame having wheels, a bail mounted to turn in bearings on said frame, a land side wheel for said bail, a beam on said bail, foot-lift devices arranged on said frame and connected for rocking said bail to raise and lower said beam, wheel connection for said bail, a ground implement on said beam, provided with a forward point and a rear heel, means for varying the depth without disturbing the relation of said wheel connection to said bail, and rear beam-supporting mechanism carried on said frame a distance behind said bail and arranged to coöperate with said bail for causing said implement to enter and leave the ground with said heel higher than said point, when the frame is level, said mechanism coöperating with said bail to keep the point lower than the heel while the implement is in the ground, said devices having the same unvarying range of movement to raise and lower the implement for all depths thereof in the ground.

24. In a wheeled implement, a frame having wheels, a bail mounted to turn in bearings on said frame, a beam on said bail, foot-lift devices arranged on said frame and connected for rocking said bail to raise and lower said beam, wheel connection for said bail, a ground implement on said beam, provided with a forward point and a rear heel, and rear beam-supporting mechanism carried on said frame a distance behind said bail and arranged to coöperate with said bail for causing said implement to enter and leave the ground with said heel higher than said point, when the frame is level, said mechanism coöperating with said bail to keep the point lower than said heel while in the ground, and means for rocking said bail in said bearings to vary the working depth of said implement, said devices having the same unvarying range of movement to raise and lower the implement for all depths thereof in the ground.

25. In a wheeled implement, a frame having wheels, a bail mounted to turn in bearings on said frame, a beam on said bail, foot-lift devices arranged on said frame, and connected for rocking said bail to raise and lower said beam, wheel connection for said bail, a ground implement on said beam, provided with a forward point and a rear heel, and rear beam-supporting mechanism carried on said frame a distance behind said bail and arranged to coöperate with said bail for causing said implement to enter and leave the ground with said heel higher than said point, when the frame is level, said mechanism coöperating with said bail to keep the point lower than the heel while in the ground, an offset land side wheel for said bail, means for adjusting the land side wheel relative to the bail, and means including a hand lever to vary the working depth of said implement.

26. In a wheeled implement, a frame having wheels, a bail mounted to turn in bearings on said frame, a beam on said bail, foot-lift devices arranged on said frame and connected for rocking said bail to raise and lower said beam, wheel connection for said bail, a ground implement on said beam, provided with a forward point and a rear heel, and rear beam-supporting mechanism carried on said frame a distance behind said bail and arranged to coöperate with said bail for causing said implement to enter and leave the ground with said heel higher than said point, when the frame is level, said mechanism coöperating with said bail to keep the point lower than the heel while in the ground, said heel being lower at the minimum working depth, relative to said point, than while entering the ground or when at maximum depth.

27. In a wheeled implement, a frame, a bail on said frame, an implement beam on said bail, a foot-lift mechanism on said frame, an offset axle at the outer end of said bail, a land side wheel on said axle, a sleeve rigid with said axle and loosely mounted on said bail, a connection between said sleeve and mechanism, said connection being adjustable for varying the working depth of said implement, thereby to change the depth without adjustment of the foot-lift, an adjustable connection between said sleeve and bail, rear supporting means coöperating with said bail to maintain the implement in working position for all adjustments of said connection, and a single hand lever suitably supported on the bail and having means for controlling both of said connections.

28. In a wheeled implement, a frame, a bail on said frame, an implement beam on said bail, a foot-lift mechanism on said frame, an offset axle at the outer end of said bail, a land side wheel on said axle, a sleeve rigid with said axle and loosely mounted on said bail, a connection interposed between said sleeve and mechanism, said connection being adjustable for varying the working depth of said implement, thereby to change the depth without adjustment of the foot-lift, an adjustable connection between said sleeve and bail, rear supporting means coöperating with said bail to maintain the implement in working position for all adjustments of said connection, and a hand lever rigid with said sleeve.

29. A wheeled plow having a frame, a beam provided with a plow-bottom rigid therewith, a front bail journaled on the frame to support said beam, devices mounted on the frame to support the rear end of said beam, mechanism for rocking said bail to raise and lower the beam and plow-bottom, and instrumentalities including a hand lever for rocking said bail to vary the working depth and keep the plow level, said devices comprising means for permitting the beam to tilt upward at the rear end thereof, in all positions of said bail, and for preventing the front end of the beam from tilting upward relative to said frame, having stops to limit said upward tilting of the beam at the rear end thereof.

30. A wheeled plow having a frame, a beam provided with a plow-bottom rigid therewith, a front bail journaled on the frame to support said beam, devices mounted on the frame to support the rear end of said beam, mechanism for rocking said bail to raise and lower the beam and plow-bottom, and instrumentalities including a hand lever for rocking said bail to vary the working depth and keep the plow level, said devices comprising means for permitting the beam to tilt upward at the rear end thereof, in all positions of said bail, and for preventing the front end of the beam from tilting upward relative to said frame, having normally engaging stops which separate only when said beam tilts upward at the rear end thereof.

31. A wheeled plow having a frame, a beam provided with a plow-bottom rigid therewith, a front bail journaled on the frame to support said beam, devices mounted on the frame to support the rear end of said beam, mechanism for rocking said bail to raise and lower the beam and plow-bottom, and instrumentalities including a hand lever for rocking said bail to vary the working depth and keep the plow level, said devices comprising means for permitting the beam to tilt upward at the rear end thereof, in all positions of said bail, and for preventing the front end of the beam from tilting upward relative to said frame, having means to regulate the action of said plow-bottom in the ground.

Signed by me at Janesville, Wisconsin, this 15th day of May, 1914.

ALVARO S. KROTZ.

Witnesses:
F. H. FARNSWORTH,
M. ALICE CLITHERO.

Copies of this patent may be obtained for five cents each, by addressing the "Commissioner of Patents, Washington, D. C."